Jan. 11, 1938. O. C. HINSON ET AL 2,104,946
PATTERN TESTING ATTACHMENT FOR DOBBY LOOMS
Filed Dec. 10, 1936  2 Sheets-Sheet 1

Inventors
O. C. Hinson
C. C. Dawson

Jan. 11, 1938.  O. C. HINSON ET AL  2,104,946
PATTERN TESTING ATTACHMENT FOR DOBBY LOOMS
Filed Dec. 10, 1936  2 Sheets-Sheet 2
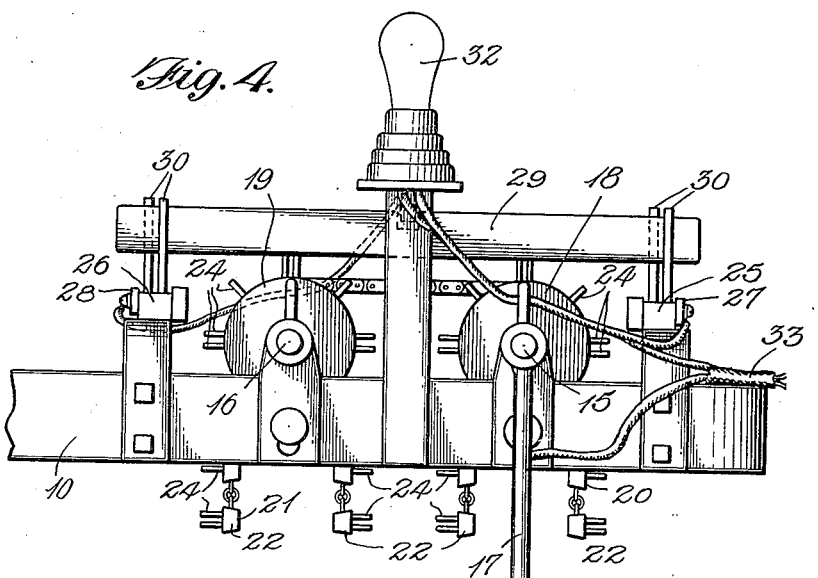
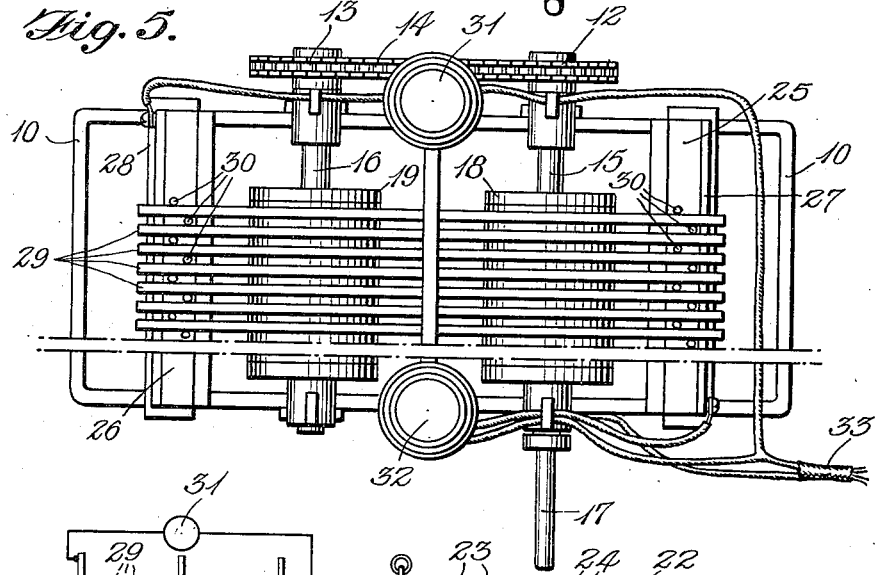
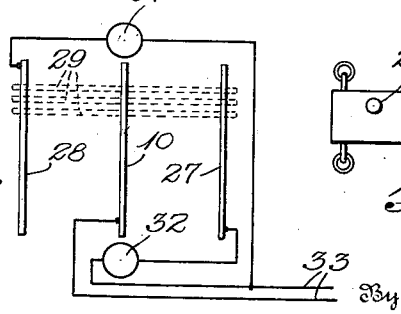

Patented Jan. 11, 1938

2,104,946

UNITED STATES PATENT OFFICE 2,104,946

PATTERN TESTING ATTACHMENT FOR DOBBY LOOMS

Odus Cromer Hinson and Council Claudius Dawson, Cramerton, N. C., assignors to Cramerton Mills, Cramerton, N. C.

Application December 10, 1936, Serial No. 115,212

5 Claims. (Cl. 73—51)

The invention relates to testing devices and more particularly to pattern testing attachments for dobby looms.

The usual master pattern is prepared from designs in the regular way and where duplicate chain patterns are necessary in order that several looms may be operated on the same design it becomes necessary to repeat the operation of placing the pins in the dobby chain connections so that each new chain will be an exact duplicate of the master chain.

The placing of these pins is a laborious task and considering the fact that in the more elaborate patterns there is a large number of pins in each slat it will be apparent that if one or more pins in one or more slats are spaced differently from the master pattern the designs produced by the duplicate chains will not be identical with that produced by the master chain. It will further be apparent that if one or more misplacements of pins occur in the duplicate patterns it will be a very laborious task to locate the pins and correct the same by the usual methods.

The object of the present invention is to provide a simple, quick and accurate means for detecting by visual indications any errors which may have occurred in such dobby patterns, so that the attendant may readily make the necessary corrections.

The device herein described detects such misplaced pins with positive accuracy and in a far more rapid manner than can be done otherwise.

The invention will be more readily understood by reference to the accompanying drawings and the further detailed description in which are set forth, by way of illustration but not by way of limitation, a specific embodiment of the inventive thought involved, it being understood that modifications and variations may be resorted to as will be apparent to those skilled in the art, without departing from the spirit of the invention.

In the drawings:—

Fig. 4 is an end view on the same scale as Fig. 3 and indicating the position of parts when the pins on the pattern being tested are properly placed.

Fig. 5 is a top plan view of the improved testing device.

Fig. 6 is a simple wiring diagram showing the operation of the indicating lamps.

Fig. 7 is a detail showing one of the slats of which the pattern chain is composed.

Figure 1:
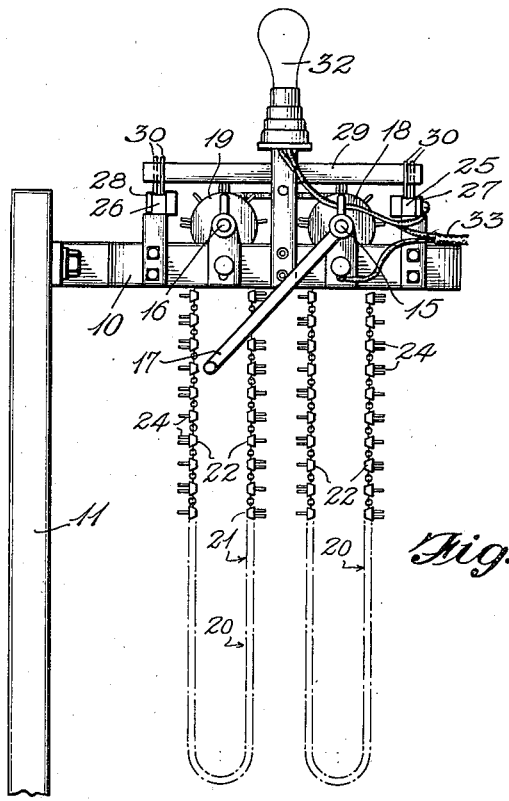
Fig. 1 is an elevational view showing our improvement, the view being taken endwise of the pattern chains.
Figure 2:
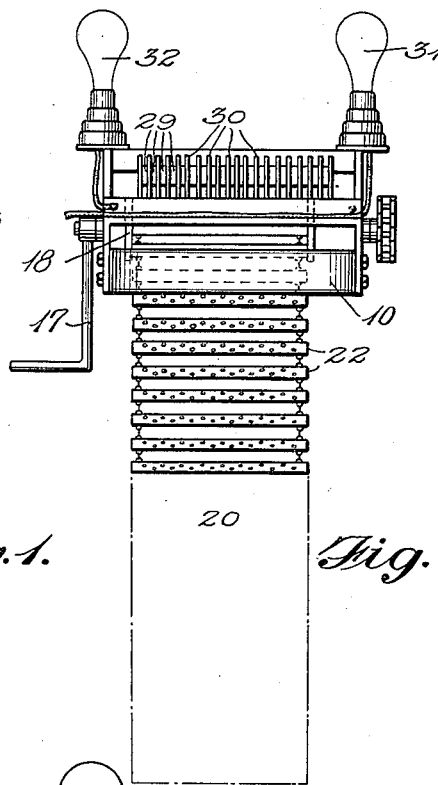
Fig. 2 is a view looking at the device laterally of one of the pattern chains.
Figure 3:
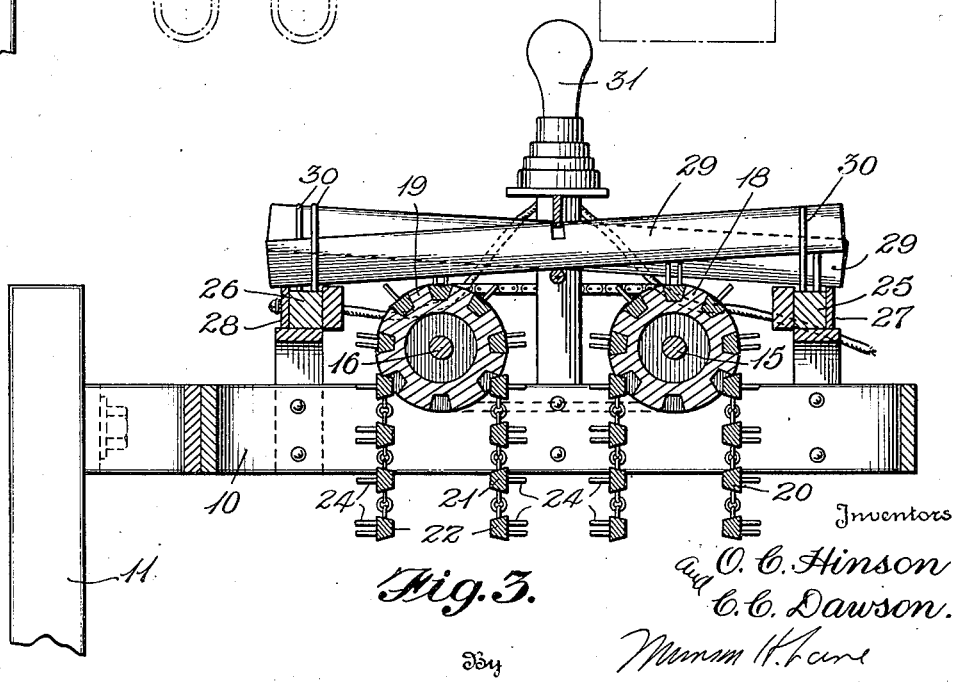
Fig. 3 is a detailed view on an enlarged scale with parts shown in section and others in elevation and portions of the pattern chains being broken away, this view indicating the position of parts when the pins on the pattern being tested are not properly placed.

Referring in detail to the drawings, the reference numeral 10 denotes a framework which may be bolted to any convenient support 11. As shown this framework carries two geared sprocket wheels 12 and 13 rotatably mounted in suitable bearings in the frame 10. The sprockets are shown as connected by a sprocket chain 14. The sprocket 12 is mounted on a shaft 15 and the sprocket 13 on the shaft 16. The crank 17 is provided at the end of one of the shafts to provide manual means for rotating the sprockets simultaneously.

Suitably attached to the shafts 15 and 16 are drums 18 and 19 on the peripheries of which are provided means for positioning the slats of the dobby chains 20 and 21 so that if the crank 17 is turned the slats 22 on the dobby chains are rotated over the drums.

Each slat 22 in these dobby chains is provided with a plurality of holes 23 arranged at regular intervals and into these holes are inserted extension pins 24, these pins being positioned at irregular intervals depending upon the pattern of the cloth that the loom is set up to weave, each slat being provided with a large number of holes so that the pins may be inserted here and there in whatever location the pattern requires. The pins 24 extend beyond the surface of the slat proper into which they are threaded and may be readily changed from hole to hole.

Resting on the framework 10 are insulator blocks 25 and 26 to which are attached metallic longitudinal plates, strips, or conductor bars 27 and 28. Laid across these longitudinal strips 27 and 28 are a series of transverse metal conductor strips 29 pivotally mounted intermediate their ends and corresponding in number to the number of holes in each slat of the dobby chain. The strips or bars 29 are separated and insulated from each other by insulating pins 30.

Two ordinary electric lamps 31 and 32 are also mounted on the framework 10 and are connected in circuit with a suitable source of current supply (not shown) by means of lamp cord 33. This electric circuit is also connected through contact bars 27 and 28, which are in series respectively with the lamps 31 and 32 and so arranged that when any one of the contact bars 29 makes contact with the conductor strip 28 the circuit is closed through lamp 31 and similarly when any one of the bars 29 makes contact with the conductor strip 27 an electric circuit is closed through lamp 32.

The operation of the apparatus is as follows:

The master dobby pattern corrected for all irregularities and ready to be duplicated is placed on the drum or cylinder 19 and the duplicate dobby pattern which is ready to be checked for accuracy is placed on the cylinder 18.

The height of the strips 29 is so adjusted that there is normally no contact at either end with either of the contact bars 27 or 28 and accordingly the electric circuits to both lamps 31 and 32 are normally open. As the master dobby chain is rotated by means of the crank 17 the pins in each slat will progressively come in contact with the bottoms of these conductor bars and raise them slightly. If there is a corresponding pin in the corresponding slat on the duplicate chain the opposite end of the bar 29 is also raised correspondingly and consequently neither end of the bar 29 makes contact with either strip 27 or 28. If however any pin in the duplicate slat is positioned incorrectly the corresponding pin in the master slat will tip the bar 29 sufficiently to make contact on either strip 27 or 28 thereby closing the electric circuit and causing either lamp 31 or 32 to glow thus indicating to the operator that the positioning of the pins in the duplicate chain is faulty.

When each pin in the master slat has a corresponding pin in the duplicate slat all the bars 29 are lifted evenly and no electric contact is made on either end but with a pin omitted in the duplicate slat from its proper position, the one lamp will glow and if the pin is incorrectly positioned in the duplicate slat the other lamp will glow.

It is therefore apparent that by slowly rotating the master chain by means of the crank 17 each slat is progressively brought into operative engagement with the tilting levers 29 and as soon as either or both lamps light there is a visible indication that a pin in the duplicate slat is improperly located or missing whereupon the operator stops the machine, corrects the position of the pin and proceeds.

In the very intricate and complicated patterns that are now employed with such dobby looms it is highly essential that the pins in the duplicate patterns be positioned with the greatest nicety and the present device permits such positioning with speed and accuracy.

We claim:—

1. A pattern testing device for dobby looms, comprising a master pattern chain having properly placed pins, a duplicate pattern chain having pins whose position is to be tested, a pair of rotating parallel drums on which the two chains are mounted, a series of pivotally mounted contact bars the opposite ends of which are adapted to be simultaneously engaged by the pins in said chains when the pins in the duplicate pattern chain are properly placed, while only one end of a bar is engaged when a pin is out of place, thereby tilting the bar, and visible means actuated by the tilting of a contact bar to indicate to the operator that the pattern being tested is incorrect.

2. A testing device as set forth in claim 1, wherein the tilting of a contact bar closes a circuit which causes an electric light to glow.

3. A pattern testing device for dobby looms and the like comprising a pair of parallel drums adapted to carry respectively a master pattern having properly spaced pins, and a second pattern having pins whose position is to be compared with those on the master pattern, means for rotating the pattern carrying drums in unison, and means adapted to be actuated by the combined movement of said patterns for indicating any errors in the positioning of the pins in the pattern being tested.

4. A pattern testing device for dobby looms and the like comprising a master pattern having properly spaced pins, a second pattern having pins whose position is to be compared with those on the master pattern, means for moving the patterns in unison, a series of contact members each adapted to be engaged simultaneously by a pair of pins, one on the master pattern and the other on the pattern being tested when the pins are correctly placed, during movement of said patterns, but adapted to be engaged by a single pin on only one of the patterns when a pin on the pattern being tested is incorrect, and indicating means controlled by said contact members.

5. A pattern testing device as set forth in claim 4, wherein the master and duplicate patterns are mounted on drums rotated at a uniform rate, which constitute the means for moving the patterns in unison.

ODUS CROMER HINSON.
COUNCIL CLAUDIUS DAWSON.